Feb. 25, 1964    L. E. LARSON    3,122,191
ANTISKID APPLIANCE DEVICE FOR VEHICLES
Filed March 30, 1962
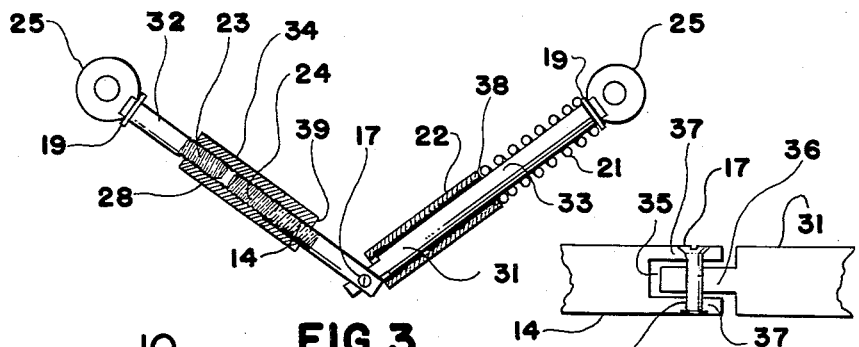
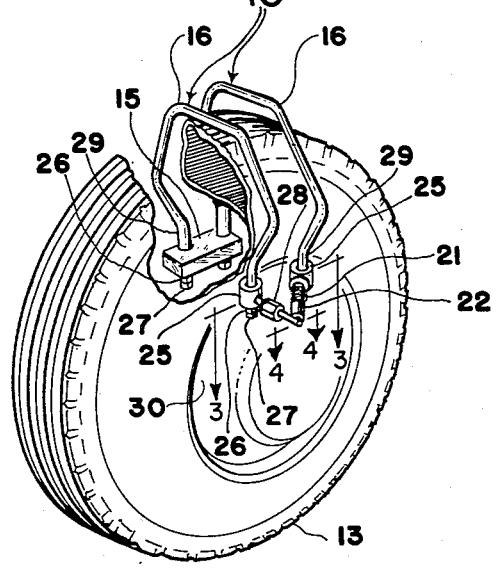
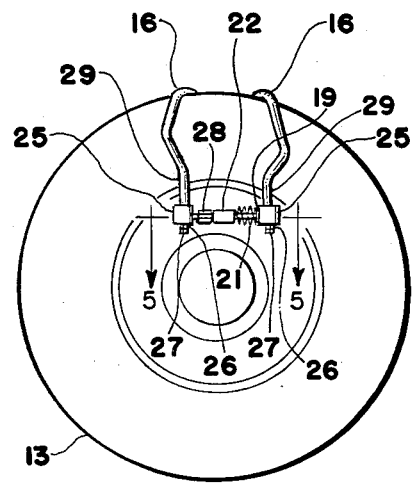
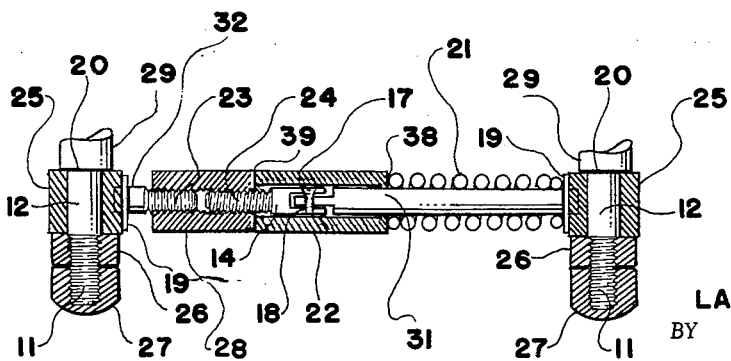
INVENTOR.
LAURENCE E. LARSON
BY
ATTORNEY 3,122,191
ANTISKID APPLIANCE DEVICE FOR VEHICLES
Laurence E. Larson, 5920 Washington Ave.,
St. Louis, Mo.
Filed Mar. 30, 1962, Ser. No. 183,867
4 Claims. (Cl. 152—225)

This invention relates to an antiskid appliance device for pneumatic wheel tires, and more particularly to a device of this character that can be instantly installed or removed without the need of accommodating tools.

Another object of this invention is to provide an antiskid device of this character that can be installed on to a tire without the requirement of elevating a vehicle wheel.

A further object of this invention is to provide an antiskid appliance device that will not dislodge itself from a vehicle wheel in the event the internal casing pressure has been materially reduced.

A still further object of this invention is to provide an antiskid appliance device that can be collapsed into various positions when not in use, to facilitate the storage of same into a minimum amount of vehicle storage space.

Therefore in accomplishing the aforestated objects of this invention, I have provided a traction device for mounting transversely on to a tire, which embodies a pair of concentrically shaped steel rods which are fashioned to the contour of the tire casing cross section, where in the rods in spaced apart relationship are tensioned to the opposite faces of the wall casing, the rods having a common pivoting arrangement at their rearward legs and a pair of pivoted co-operating arms or elements mounted laterally at their forward legs, wherein the movement of the traction rods from a substantially straight inline transverse tire mounting inoperative position to a front diverged tire clamping operative position is co-operative with the movement of the lateral arms, the tire tensioning or clamping position is maintained by a slidable collar that is urged resiliently from one arm onto the other when they are in co-axial alignment. The amount of tension required for securely mounting on to various widths and shaped tires is by a pre-determined adjustment of a turnbuckle means arranged between one of the lateral arms for either elongating or shortening the length of the arms.

The rearward mounted pivoting member as well as the front mounted operating arms lie substantially downward and inwardly of the peripheral surface of the tire's rim, when in operating position. This prevents the traction device from dislodging itself from the wheel should the tire become inoperative.

Other objects, features and advantages will become more readily apparent from the following description and the accompanying sheet of illustrative drawings.

In the accompanying sheet of drawings wherein like numerals are employed to designate like parts throughout the views.

FIGURE 1 is a perspective view of my invention, inoperatively adapted to a vehicle tire with a transverse section of the tire removed for revealing the rearward operating elements.

FIGURE 2 is a front elevational view of FIGURE 1 which shows my antiskid appliance device adapted and in operative position on to a vehicle tire.

FIGURE 3 is an enlarged plan view taken along lines 7—7 of FIGURE 1 which illustrates the adjustment and locking means of this invention.

FIGURE 4 is an enlarged front elevational view of the detachably secured pivoting arrangement between the inner ends of the lateral arms and which view is taken along lines 9—9 of FIGURE 1.

FIGURE 5 is an enlarged cross sectional view of the complete operating elements of the adjustment and locking device when in operating position and the view is taken substantially along lines 8—8 of FIGURE 2.

In the drawings, my antiskid appliance device 10 comprises a pair of traction members or concentric steel rods 16, where an inner body portion of the traction rods are arcuately formed with spaced apart legs 29 adapted to engage a transverse cross sectional portion of a pneumatic tire 13, with the legs extending vertically downward in relationship to a horizontal top tire mounting position and terminating below the peripheral edges of the tire mounting rim 30, the legs being dimensioned substantially less than the traction rods, thereby forming abutments or shoulder portions 20, axials 12 and threaded studs 11 integral with the traction rods.

The rearward legs 29 are comated pivotally into eye bar 15 which is apertured intermediate its ends for journally receiving the axials 12 and wherein longitudinal movement of the eye bar 15 in relationship with axials 12 is controlled by frictional locknuts 26, and wherein rotative movement of the locknuts is secured by closed headed locknuts 27.

The forward legs 29 axially receive a pair of laterally mounted arms 33 and 34, and which arm 33 embodies a journalling collar 25 which is recessed into its peripheral surface and intermediate its ends for slidably receiving arm element 31 and wherein the relationship is secured by weld 19, the arm element 33 slidably receives compression or coiled spring 21 and locking collar 22 and which collar is dimensioned internally to frictionally engage the peripheral surface of arm element 33 wherein the coiled compression spring 21 rearward movement is limited by the shoulder of the circumferential weld 19 and the spring's forward movement by the inner shoulder portion 38 of slidable collar 22.

The arm member 34 embodies a similar journalling collar 25 secured to threaded rod 32 with its terminal end threadably receiving adjustment collar 34 in a clockwise rotation and arm element 14 in a reverse manner forming a turnbuckle arrangement for adjusting the length of lateral arm 32.

The arms 33 and 34 are comated and pivotally secured at their inner ends by a formed recess or slot portion 35 which slidably receives tongue 36 formed integral with their respective arms, wherein the relationship is pivotally secured by registered apertures 18 through both the slot shank members and the tongue slidably receiving a tapered headed pin 17, wherein the head and the shank of the pin are concealed within the peripheral surface of the slot shank elements 37 by a countersunk bore arranged in its upper surface.

The collar 22 is urged on to a body portion of arm element 14 of lateral arm 34 by compression spring 21 when the arms are in co-axial alignment with the inner shoulder 39 of adjustment collar 28 forming a stop or limiting means for the travel of slidable locking collar 22, whereby the co-axial alignment of the lateral arms 33 and 34 become detachably secured.

In practicing my invention, I place my antiskid appliance device on to a section of a tire casing with the traction rods in a substantially straight inline collapsed state, transversely the tire threads with the pivoting member positioned at the rearward side of the tire casing and below the peripheral edge of the tire rim with the forward mounted lateral arms positioned in a similar manner at the front side of the tire casing, as the turnbuckle arrangement for adjusting the traction device for various width tires was determined at a prior time it can be readily seen and understood that by moving the lateral arms towards the tire face that the traction rods will instantly clamp the tire section with viselike gripping action maintained by the slidable locking collar engaging both lateral arms when they have reached a co-axial alignment position relative to the aforementioned forward movement of the arms. Furthermore in removing my antiskid appliance device from a tire I merely overcome the compression spring forward urgement by sliding the locking collar back on to its inoperative position and pull the lateral arms forward wherein I collapse my traction device for easy removal from the tire.

Having described the invention what is claimed as new is:

1. In combination with a vehicle wheel including a hub and a peripheral rim, and a tire mounted on said rim, an antiskid device comprising a pair of arcuate traction rods extending transversely over said tire, each rod having an inner leg and an outer leg, disposed respectively on inner axial and outer axial sides of the wheel, each leg having an offset portion extending radially and axially inwardly of the rim of said wheel, and a reduced extremity, said extremity extending in parallelism to the radial plane of the wheel, means pivotally connecting the extremities of the inner legs in spaced parallel relation, a pair of arm members, each having one end pivotally connected to one of said extremities of said outer legs, means pivotally connecting the other ends of said arm members together for movement in a plane lying axially of the wheel, means for securing said other ends in axial alignment, separating said outer legs to clamp said rods about said tire, release of said last mentioned means permitting said arms to pivot outwardly axially of the wheel relative to each other to permit rotation of said rods to substantial parallelism and effect release of the clamp.

2. The structure of claim 1 wherein the extremity of each leg is formed with a threaded extension and nuts are positioned on said threaded extension to hold said means pivotally connecting the extremities of the inner legs, and said pair of members pivotally connected to the extremities of said outer legs in related assembly.

3. The structure of claim 1 wherein the means for securing the other ends of the arms in axial alignment comprise a collar slidably mounted on one of said arms, and spring means biasing said collar to a position overlying the pivotal connection of the ends of said arms.

4. The structure of claim 1 wherein one of said arms is comprised of two portions having adjacent oppositely threaded ends connected by a rotatable turnbuckle for adjusting the tension exerted by said legs in clamping said tire.

References Cited in the file of this patent

UNITED STATES PATENTS

| | | |
|---|---|---|
| 841,473 | Weaver | Jan. 15, 1907 |
| 2,691,999 | Ziegler | Oct. 19, 1954 |